United States Patent [19]

Noel

[11] Patent Number: 5,454,153

[45] Date of Patent: Oct. 3, 1995

[54] ADJUSTABLE ASSEMBLY FOR USE IN THE REPAIR OR REPLACEMENT OF A PITCH CHANGE LINK OR ROD END OF CRITICAL PREDETERMINED LENGTH

[76] Inventor: Hector Noel, 1980 SW. 33rd Ct., Miami, Fla. 33145

[21] Appl. No.: 112,347

[22] Filed: Aug. 27, 1993

[51] Int. Cl.$^6$ ...................................................... B23Q 1/04
[52] U.S. Cl. ............................................. 29/281.1; 269/50
[58] Field of Search ................................. 269/47, 50–52, 269/99, 100, 296, 299; 29/281.1, 281.5, 281.4, 283

[56] References Cited

U.S. PATENT DOCUMENTS

| | | | |
|---|---|---|---|
| 2,568,508 | 9/1951 | Montague | 269/51 |
| 3,048,387 | 8/1962 | Waggoner | 269/51 |
| 4,577,843 | 3/1986 | Milwain | 269/51 |

*Primary Examiner*—Robert C. Watson
*Attorney, Agent, or Firm*—Malloy & Malloy

[57] ABSTRACT

For use while repairing or replacing an elongate variable length device of critical overall length, such as a pitch change link device for a helicopter blade, which device includes a joint threadably connected for axial movement on each end to effect adjustment of the overall length of the device by threaded movement of one or both of the adjustable joints; an assembly which includes an elongate base on which a fixed and a movable mounting post are connected in upstanding spaced apart parallel relation to one another with the movable post being movable along the length of the base in a track structure so as to be capable of varying the spacing between the posts; the posts are constructed to removably receive and support the joints on the device, and the movable post is adapted to be locked in a fixed spaced relationship from the fixed post to record and preserve the exact length of the critical length device while it is being repaired.

16 Claims, 2 Drawing Sheets

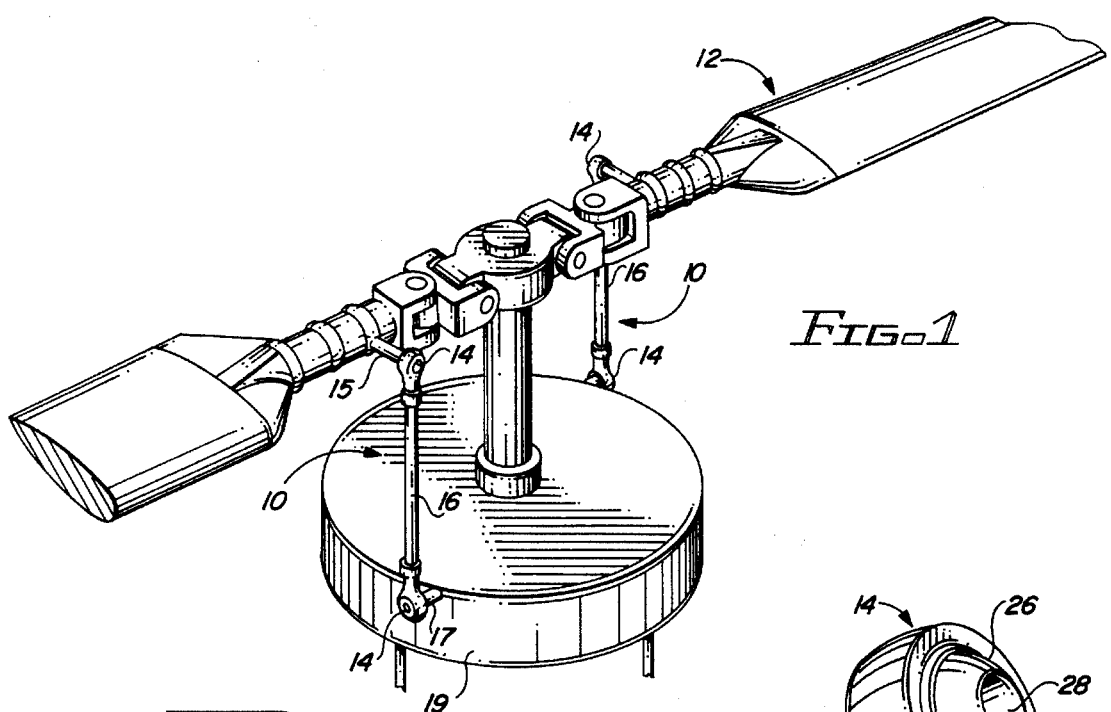
FIG-1
FIG-2
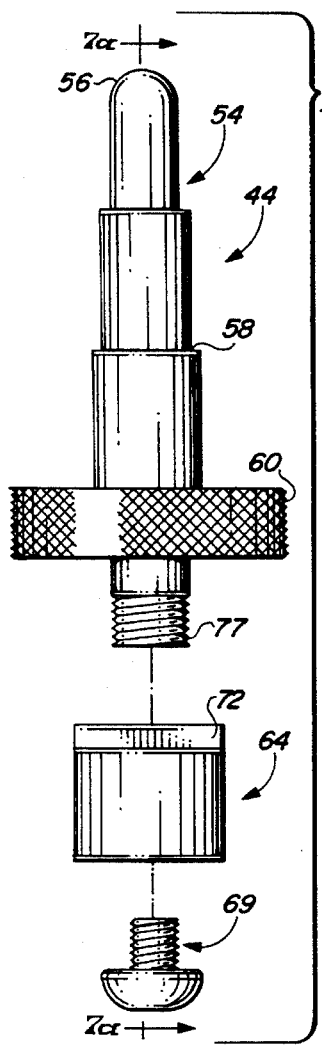
FIG-7
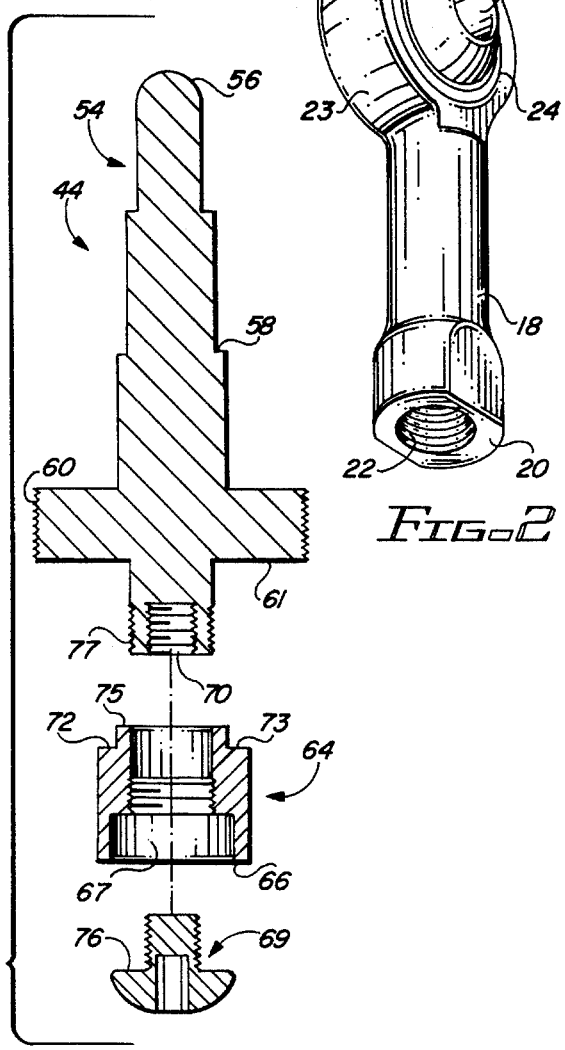
FIG-7a

ADJUSTABLE ASSEMBLY FOR USE IN THE REPAIR OR REPLACEMENT OF A PITCH CHANGE LINK OR ROD END OF CRITICAL PREDETERMINED LENGTH

BACKGROUND OF THE INVENTION

1. Field of the Invention

This invention relates to an assembly for use in recording or preserving the predetermined and critical overall length of an elongate variable length device, such as a pitch change link device for a helicopter blade. The assembly is used prior to the repair or replacement of the critical length device. This is so that, after the repair or replacement of the device, its overall length can be adjusted, if needed, so that it is equal to the original critical length before the repair or replacement of it. Such critical length devices, ordinarily, include an adjustable joint threadably connected on each end of an elongate member. The overall length of the critical length device can be adjusted by threaded movement of one or both of the joints. This invention is for use to record and preserve the critical overall length of such a device prior to a repair or a replacement of it with a repaired or replaced device. Using the assembly of this invention as a reference, the repaired or replaced device can be adjusted so that it is the same predetermined critical length it should be.

2. Description of the Prior Art

The use of pitch change links on helicopters is well known. Pitch change links determine the pitch of helicopter blades. A pitch change link is composed a member having an axially movable joint attached to each of its opposite ends. When adjusted to a precise critical length, it is utilized to set the pitch of an individual helicopter blade. The overall length of the pitch change link, including the end joints, sets or determines the precise pitch of an associated blade. There is no room for error of that overall length. It is precisely set and the length is critical. In use, the links rotate with each blade and are connected to the innermost end of each blade substantially adjacent the primary rotor for the individual blades.

The correct pitch of a blade is dependent on the length of the link. A variance in the pitch of the individual helicopter blade is of course extremely important. A change of the predetermined overall, critical length of the all important pitch change link of a blade, even as much as 0.010 inch, will result in extreme wear and fatigue of the frame and components of the helicopter. Accordingly, it is extremely important, after the initial assembling of the helicopter, that any subsequent removal of a link for a repair or replacement be followed by replacement of a link that is the same precise overall length as was the link when removed from the helicopter. By way of further explanation, in the case of a helicopter pitch change link, it is a rod with adjustable joints connected to the rod at each end. The joints are commonly known in the industry as Heim joints. Typically, such joints include a stem having, at one end, a threaded aperture in which a ball is rotatably housed, at the other end, an internally threaded recess for threaded connection to one of the ends of an elongate member or bar spanning a pair of such end joints.

Based on the critical need to maintain the overall length of each pitch change link for helicopter blades, it is important that a device be available to preserve and record the overall link length as an aid in repairing and replacing the links. To date, no such device or assemblies are available which will ensure the accurate and convenient replacement of a pitch change link from a helicopter with one which is of the same precise overall and critical length as it was prior to the removal of the link from a helicopter.

SUMMARY OF THE INVENTION

The present invention relates to a device or assembly on which there may be positioned a rod having a threadably adjustable joint connected to each end, e.g., a pitch change link. Such link may take the form of a pitch change link commonly used to set the pitch of an individual blade of a helicopter. The present invention is capable of use in preserving and recording the overall length of other types of elongate links or bar structures prior to a repair or replacement of them; and the invention is particularly useful where such structures include the presence of an axially adjustable joint at each of the two opposite ends thereof.

With respect to helicopters, the type of end joints currently used are referred to as Heim joints. They are typically used in pitch change link assemblies for helicopters, as set forth above.

Such Heim joints include a stem having an annular portion at one end defining the perimeter of an opening. A universally movable ball having a central aperture therethrough is captively and rotatably mounted within the opening in the annular portion, thereby forming a substantially universally adjustable joint.

The opposite end of the Heim joint stem is internally threaded so as to allow connection to the corresponding threaded end of the rod or link. The length of a pitch change link may be adjusted by threaded movement of the Heim joints. Thus, the overall length of a pitch change link may be varied until it is of a precise overall length and then set. The setting is critical. It determines the overall length of a pitch change link and the length of a helicopter blade. In spite of repairs and replacements, the length should remain the same, unless reset. Until reset, the pitch change link assembly for a blade may, however, need to be removed for repair or replacement. This invention is for use in such a repair or replacement job.

The assembly of the instant invention includes an elongate base having a substantially linear configuration and also having a track means formed therein. The track means includes two spaced apart track rails extending along all or at least a majority of the length of the base. These rails have innermost linear peripheral edges spaced by an elongate slot extending along the length of the rails to separate the rails a standard distance from one another. The subject assembly further includes a first fixed mounting sub-assembly and a second movable mounting sub-assembly, each including an upstanding post having an outermost free end adapted to receive and support the adjustable end joint of a pitch change link. When supported, one of the outermost ends of each post is in one of the apertures of one of the adjustable Heim joints.

The first fixed mounting sub-assembly has its upstanding or elongate support post fixedly secured, preferably to one end of the base immediately adjacent a corresponding end of the track means and the elongate slot as set forth above.

The second movable mounting sub-assembly with its upstanding or elongated support post is movable along the length of the track means, so as to selectively be able to vary the space between the support posts of the first and second mounting sub-assemblies. This accommodates the mounting of pitch change links or other like devices of different overall lengths.

The second mounting sub-assembly includes a connecting means associated with a lock means each of which are cooperatively adapted so as to allow positioning of the post of the second mounting sub-assembly at substantially any point along the length of the track means for recording and preserving the overall length of a supported structure of a critical length. Once in such a supported position, the critical overall length is reflected, recorded, and preserved. This is because the lock means provided on the device is clamped to hold the position of the second mounting sub-assembly in a precise position on the rails of the track means. It is maintained in that position, while the pitch change link or similar structure is removed and repaired or replaced. The repaired or replaced structure is then positioned on the assembly; and its length is adjusted by threaded movement axially of one or both of the end or Heim joints until it is equal the same precise length as the pitch change link when removed from the mother device such as a helicopter.

BRIEF DESCRIPTION OF THE DRAWINGS

For a fuller understanding of the nature of the present invention, reference should be had to the following detailed description of a preferred embodiment taken in connection with the accompanying drawings in which:

FIG. 1 is a partial perspective view showing a pitch change link of a helicopter blade.

FIG. 2 is a perspective view of an adjustable "Heim joint;" it is of the type used on the opposite ends of helicopter pitch change links, as seen at 14 in FIG. 1.

FIG. 7 is an exploded view of the movable or secondary mounting sub-assembly 44 seen in FIG. 3 and as described herein.

FIG. 7A is a view in cross section taken on the plane indicated by the line 7a–7a of FIG. 7 and looking in the direction of the arrows.

Like reference numerals refer to like parts throughout the several views of the drawings.

DETAILED DESCRIPTION OF THE PREFERRED EMBODIMENT

Figure 3:
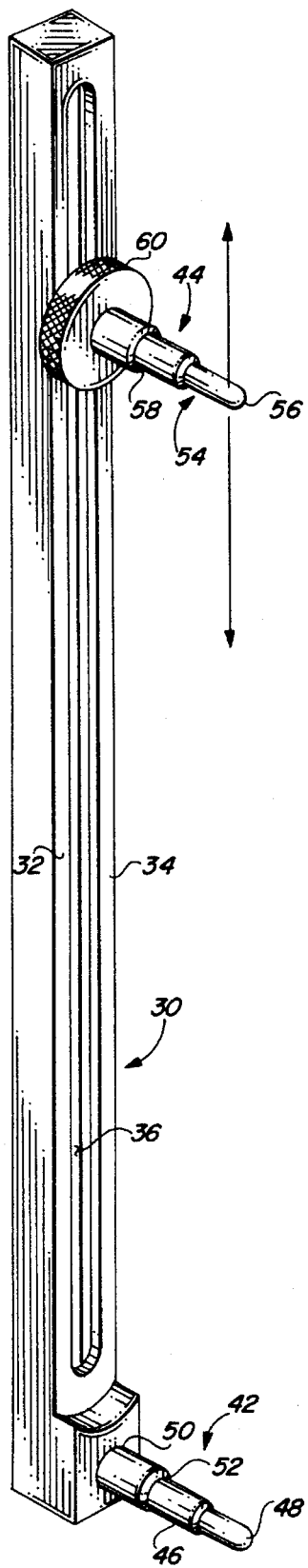
FIG. 3 is a perspective view of the subject assembly showing its upper surface.

As shown in the accompanying figures, the present invention is directed towards an assembly (see FIGS. 3–7A) which facilitates the accurate repair, maintenance, etc. of a pitch change link generally indicated as 10 in FIG. 1. It is of the type used to maintain the pitch of a helicopter blades 12.

As shown in both FIGS. 1 and 2, a component of the pitch change links is an adjustable joint 14, a Heim joint, one of which is located at each opposite end of the elongated rod 16 which serves to interconnect the Heim joints 14.

Some details of the adjustable Heim joints are shown and will be described with specific reference to FIG. 2 as background for the description of the assembly of this invention.

Each of the Heim joints includes an elongated stem as at 18 having one free end 20 with a substantially interior threaded surface portion as at 22. The interior threaded surface portion 22 is meant to mate with externally threaded nubs, not shown, on the opposite extremities of the link rod 16, as seen in FIG. 1. As is commonly known in the field, a stop nut or lock nut, not shown, is provided at the juncture of the rod and the joints which prevents loosening of the rod end during operation of the helicopter.

In order to facilitate the assembling of the links, that is the rod 16 with a Heim joint 14 on each end, the internal threaded surface 22 of each of the joints 14 may be oppositely threaded axially so that the rod 16, when assembled to both of the joints 14, can be rotated in a single direction to accomplish the threading engagement with both joints 14.

Further with regard to FIG. 2, the other end of the stem includes an enlarged head as at 23 having a central opening as at 24 in which is mounted a plurality of packing rings which surround a rotatable ball member 26. On reference to FIG. 1, the ball member has a central aperture 28 which is used to attach either a) to the pitch change horn 15 which is attached directly to the blades 12 or b) to a stem 17 on the rotating swash plate 19 or central rotor. Therefore, it should be obvious that the adjustable joint 14 or Heim joint is in effect a universally movable joint defined by a ball and socket structure.

Figure 4:
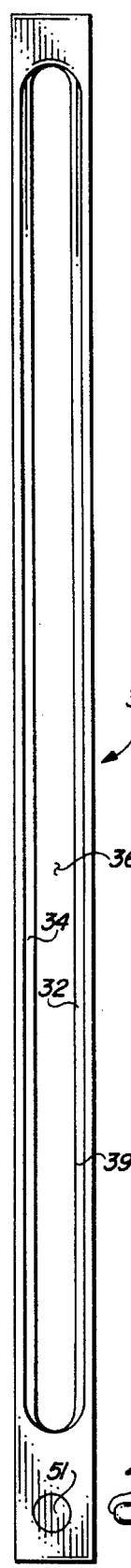
FIG. 4 is a bottom plan view of the base of the subject assembly seen in FIG. 3, with the movable sub-assembly 44 removed therefrom.
Figure 5:
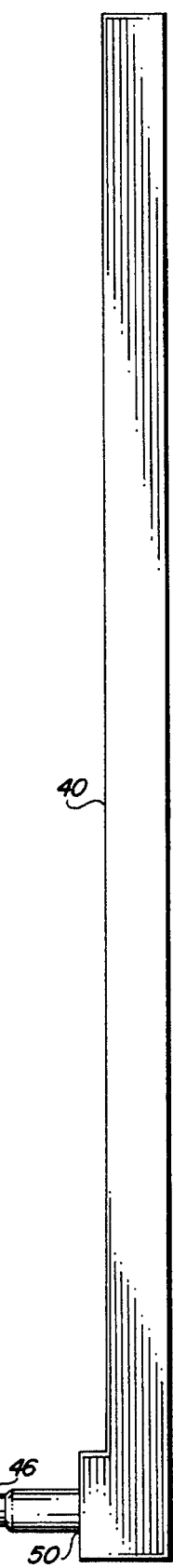
FIG. 5 is a side elevation view of the subject assembly seen in FIG. 4.
Figure 6:
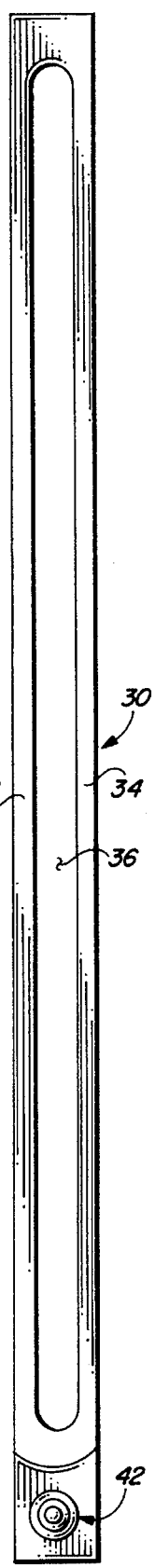
FIG. 6 is a top plan view of the base of the subject assembly seen in FIG. 4.

With reference to FIGS. 3–6, the assembly of the present invention comprises an elongated base generally indicated as 30 and includes a substantially linear configuration. The base includes a track means integrally formed thereon. The track means includes two spaced apart rails 32 and 34 which extend along a vast majority of the length of the base 30. The rails 32 and 34 are separated by an elongated slot as at 36 which has substantially the same transverse dimension along its length thereby assuring that the rails 32 and 34 will be spaced apart a consistent distance along their length. With reference to FIG. 4, it can be seen the under surface or under portion of the base 30 includes an inset recess as at 39 whereby access is provided to the rails 32 and 34 as well as the slot 36 from either an upper or frontal portion of the base generally indicated as 40, see FIG. 5, or an under portion as best disclosed in FIG. 4. The overall length of the base may vary and if desired be composed of two portions which telescope together.

In a preferred embodiment of the present invention and on reference to FIG. 3, the subject assembly includes a first fixed mounting sub-assembly generally indicated as 42 and a second movable mounting sub-assembly generally indicated as 44. The fixed mounting sub-assembly 42 includes an elongated post generally indicated as 46 having a free end as at 48 and having an under portion 50 (see FIG. 3) wherein the lower or base portion of the post 46 is fixedly anchored to the base. In a preferred embodiment, this may be achieved by a press fit as at 51, see FIG. 4. In an alternative embodiment, not shown, the post may be the same length as the movable post 54 and be threadably connected to the base. In any event, the fixed post 46 is preferably at one end of the base or at some specific, fixed point along the length thereof. Further, the post 48 has a stop or shoulder as at 52 which is constructed in the form of an enlarged diameter portion having a transverse dimension greater than that of the free end 48 and the diameter of the length of the post 46 extending from the free end 48 to the stop member 52. The purpose of the stop 52 will be explained in greater detail hereinafter.

As shown in FIGS. 3, 7 and 7A, the movable mounting sub-assembly is generally indicated as 44 and includes an elongate post generally indicated as 54 having a free end 56 dimensioned and configured similar to the free end 48 of the post 46 of the first mounting assembly 42. The post 54 also has a stop as at 58 which is constructed to include a larger diameter than the length of the post 54 extending between the free end 56 to the actual stop 58. Further, the lower end of the post 54 includes a radially outwardly extending knob 60 having a knurled outer surface. The knob is fixedly attached relative to the remainder of the post 54 so as to rotate therewith. The knurled surface on the knob 60 facilitates gripping of the knob and accordingly facilitates rotation of both the knob and the elongated post together when it is mounted on the track means associated with the base 30. In an operative position, the second mounting assembly 44 may be positioned at any selected distance from the fixed mounting assembly 42 between the ends of the slot 36. In assembly, both the first and second posts 46 and 54 are disposed in upstanding substantially parallel and spaced apart relation to one another and their respective terminal ends extend outwardly a common distance from the front or upper surface 40 of the base 30. The distance between the first and second post 46 and 54 may be varied in order to accommodate the precise overall lengths of the various pitch change links such as 10, (See FIG. 1), which of course come in different sizes depending upon the style and/or size of the helicopter on which they are used. It should be emphasized at this point that other devices can be easily mounted and adjusted, assembled, maintained, repaired, etc. using the assembly of the present invention. It is important to note that this assembly is meant to have mounted thereon, in an operative position, any such device having an elongated rod with adjustable joints mounted at opposite ends thereof.

Again with regard to the first and second posts 46 and 54 respectively, the free ends 48 and 56 and the length of the post extending down to the respective stops 52 and 58 thereon are of such a transverse dimension so as to fit within the central aperture 28 of the ball 26 of the adjustable joints 14 disclosed in some detail in FIG. 2. Heim joints are of different sizes and each size has an aperture 28 of a different diameter depending on the Heim joint size. For this reason, the distal end portion, see 48 and 56 of each of the mounting posts are of a smaller diameter to accommodate a smaller Heim joint, while the intermediate post portions, see 46, for example, FIG. 3, are of a somewhat larger diameter to accommodate a larger Heim joint. Likewise, the proximal end of each post is of a larger diameter than the intermediate portion. When a joint is so mounted, one on each post, the stem portion 18 of each joint 14 will extend radially outwardly from the post and such stems of the oppositely disposed joints will be axially aligned so as to confront one another and a link rod 16 will span them.

With reference to FIGS. 3, 7 and 7A, the second movable mounting sub-assembly 44 includes a connecting means and a lock means associated therewith.

The connecting means is in the form of a rider structure 64 having a substantially annular configuration defined by an open counterbored outer end 66 and a counterbored inner end 75 which includes a threaded central portion between the counterbored ends. The rider structure 64 is such as to allow the passage therethrough of an exteriorly threaded connector element 77 or leg on the post of the second mounting sub-assembly. This leg which is exteriorly and interiorly threaded will threadedly engage or otherwise mate in the interiorly threaded inner end 67 of the rider structure 64. The inner end surface of the rider structure 64 includes two recesses in diametrically opposed relation and formed on opposite sides thereof in the innermost end. These recesses as at 72 and 73 will be disposed, dimensioned, and otherwise adapted to ride along and slidingly engage the inner peripheral edges of the rails 32 and 34 which define track means. In assembly, the innermost end 75 of the rider structure 64 will dwell in the elongate slot 39 and between the confronting surfaces of the rails 32, 34 so as to ride therein when the connector or leg 77 is in the slot 39. Accordingly, the post 54 may be locked in any given position along the rails or slot 39 with the under portion 61 engaging the peripheral zone along the slot clamping it between it and the face 72 and 73 of the rider structure 64. The second assembly 44 and its post 54 is locked in position by turning the knob 60 so that the connector portion 77 of the post is threadably advanced into the rider element 64 until the surfaces 72 and 73 clamp onto the peripheral zone about the slot 39 and is clamped in position. Similarly, the knob may be manipulated to release the peripheral zone about the slot so that it may be moved along the slot or rail from the sandwiched or clamped position between the surface 61 and the surfaces 72 and 73.

For replacing or repair of a pitch change link, such as 10, the adjustable joints 14 of the link rod 16 of the pitch change link may be removably mounted on the respective posts in a manner set forth above. Thereafter, the second mounting sub-assembly 44 and more particularly the second post 54 is locked into a fixed, predetermined, spaced distance from the first post 46. This then sets or preserves the precise length of the pitch change link to be repaired or replaced. The pitch change link may then be removed and disassembled or repaired or replaced. Thereafter, the repaired or new rod and joints, e.g., pitch change link repositioned on the entire assembly of this invention. The joints 14 of the pitch change link are threadably advanced or withdrawn until the pitch change link is the precise overall length or dimension preserved by the entire assembly. The pitch change link lock nut (not shown) can be tightened without disturbing the alignment plane of the rod nor the preserved length of the rod. Thus, the user is confident that when the pitch change link has been replaced on the helicopter, the pitch of the rotor blade will remain the same.

Within the connector portion 77 of the post 54, there is a threaded recess 70 which, in assembly, engages the threaded stem of a screw 69 which is headed as at 76. The headed end is received in a counter bore in the end 66 of the rider structure 64. The screw 69 has a conventional recess for receiving a key or Allen wrench. The purpose of the screw 69 is to keep the movable sub-assembly 44 together when loosened for movement along the track, the headed end of the screw 69 remaining within the counter bore 67 of the rider structure 64 and maintaining the post and rider together for sliding movement along the track.

While this invention has been shown and described in what is considered to be a practical and preferred embodiment, it is recognized that departures may be made within the spirit and scope of this invention which should, therefore, not be limited except as set forth in the claims which follow and within the doctrine of equivalence.

Now that the invention has been described,

What is claimed is:

1. For use in preserving a predetermined overall length of an elongate, variable length device, such as a pitch change link device for a helicopter blade, which device has an adjustable joint threadably connected on each end to effect adjustment of the length of the device on threaded movement of one or both of the joints to facilitate repair or replacement of the device with a repaired or replacement device of the same predetermined overall length, an assembly comprising:

a) an elongate base having opposite ends, b) a mounting means connected to said base to removably mount the device to said base, c) said mounting means comprising a first and a second mounting assembly secured to said base in spaced relation to one another along the length thereof, d) said base including track means movably supporting said second mounting assembly on said base, e) each of said first and second mounting assemblies including means to receive and to support removably one of the adjustable joints of the device being repaired or replaced when the device is positioned in spanning relation on the mounting assemblies, f) said means to receive and to support comprising a post included on each of said first mounting assembly and said second mounting assembly, said posts extending outwardly from said track means in a common direction and in substantially parallel, spaced apart relation;

g) each of said posts including a distal end zone, a proximal end zone, and an intermediate zone, the diameter of said distal zone being less than the diameter of said intermediate zone and the diameter of said intermediate zone being less than the diameter of said proximal zone;

h) means movably connecting said second mounting assembly and said track means for movement of said second mounting assembly along said track means to adjust the distance between said first and second mounting assemblies; and i) said means movably connecting including lock means to lock said second mounting assembly in a locked position on said track means in spaced relation from said first mounting assembly when one of the joints is received and supported by said first mounting assembly and the other of said joints is received and supported by said second mounting assembly.

2. An assembly as set forth in claim 1 wherein said lock means comprises clamp means to releasably clamp said second mounting assembly to said track means at a selected location along the length.

3. An assembly as set forth in claim 2 wherein said clamp means includes a rider structure in sliding engagement in said track means in said base and means captivating the rider structure to said track means.

4. An assembly as set forth in claim 1 wherein each of said posts includes a free outer end and each end is adapted to removably receive and support an adjustable joint of the device.

5. An assembly as set forth in claim 1 wherein said post of said second mounting assembly includes a foot portion extending into said track means for movably engaging said track means and means slidingly captivating said second mounting assembly for sliding movement along said track means.

6. An assembly as set forth in claim 1 wherein said means movably connecting includes a rider structure sized and configured to slidingly engage said track means along its length at any one of a plurality of locations along said track means.

7. An assembly as set forth in claim 1 wherein said track means comprises an elongate, linear configuration and two elongate rails disposed in parallel relation to one another and spaced from one another by an elongate slot in said base extending along the lengths of said rails.

8. An assembly as set forth in claim 6 wherein spaced apart recesses are provided in said rider structure, each recess disposed and dimensioned to slidingly receive an inner peripheral edge of one of said rails.

9. The assembly as set forth in claim 6 including keeper means to maintain the rider structure and said post of said second mounting assembly connected together at all times during use of the assembly.

10. For use in preserving a predetermined overall length of an elongate, variable length device, such as a pitch change link device for a helicopter blade, which device has an adjustable joint threadably connected on each end to effect adjustment of the length of the device on threaded movement of one or both of the joints, to facilitate repair or replacement of the device with a repaired or replacement device of the same predetermined overall length, an assembly comprising:

a) an elongate base having opposite ends, b) a mounting means connected to said base to removably mount the device to said base, c) said mounting means comprising a first and a second mounting assembly secured to said base in spaced relation to one another along the length thereof, d) said base including track means movably supporting said second mounting assembly on said base, e) each of said first and second mounting assemblies including means to receive and to support removably one of the adjustable joints of the device being repaired or replaced when the device is positioned in spanning relation on the mounting assemblies, f) said means to receive and to support comprising a post included on each of said first mounting assembly and said second mounting assembly, said posts extending outwardly from said track means in a common direction and in substantially parallel, spaced apart relation;

g) means movably connecting said second mounting assembly and said track means for movement of said second mounting assembly along said track means to adjust the distance between said first and second mounting assemblies;

h) said means movably connecting including a rider structure sized and configured to slidingly engage said track means along a length thereof at any one of a plurality of locations along said track means;

i) said means movably connecting including lock means to selectively lock said second mounting assembly in a locked position on said track means in spaced relation from said first mounting assembly when one of the joints is received and supported by said first mounting assembly and the other of said joints is received and supported by said second mounting assembly, and j) said post of said second mounting assembly further including a knob member fixedly secured to a lower end thereof and rotatable with said post of said second mounting assembly relative to said track means and said rider structure.

11. An assembly as recited in claim 10 wherein said lock means comprises clamp means to releasably clamp said second mounting assembly to said track means at a selected location along its length.

12. An assembly as recited in claim 11 wherein each of said posts includes a free outer end and each end is adapted to removably receive and support an adjustable joint of the device.

13. An assembly as recited in claim 11 wherein said post of said second mounting assembly includes a foot portion extending into said track means for movably engaging said track means and for secure yet removeable connection with said rider structure.

14. An assembly as recited in claim 11 wherein said track means comprises an elongate, linear configuration and at least two elongate rails disposed in parallel relation to one another and spaced from one another by an elongate slot in said base extending along the lengths of said rails.

15. An assembly as recited in claim 14 wherein said rider structure includes spaced apart recesses, each recess disposed and dimensioned to slidingly receive an inner peripheral edge of one of said rails.

16. An assembly as recited in claim 11 further comprising keeper means to maintain said rider structure and said post of said second mounting assembly connected together during use of the assembly.

* * * * *